Patented July 9, 1940

2,206,924

UNITED STATES PATENT OFFICE 2,206,924

PRODUCTION OF MONO - ALKYL SUBSTITUTED COMPOUNDS OF META-CRESOL FROM MIXTURES OF META- AND PARA-CRESOLS

Donald R. Stevens, Swissvale, and Joseph B. McKinley, Pittsburgh, Pa., assignors to Gulf Research & Development Company, Pittsburgh, Pa., a corporation of Delaware No Drawing. Application June 7, 1938, Serial No. 212,386

8 Claims. (Cl. 260—624)

This invention relates to the production of mono-alkyl substituted compounds of meta-cresol from mixtures of meta- and para-cresols; and it comprises a method in which a mixture of meta-cresol and para-cresol is treated with an olefin to form a mixture of di-alkyl-meta-cresol and di-alkyl-para-cresol, the reaction mixture is separated into its components by fractional distillation, the di-alkyl-meta-cresol fraction is digested in the presence of an acid catalyst, with a cresol having no added alkyl substituents, the digestion mixture is neutralized with dilute aqueous alkali solution and fractionally distilled to separate out the mono-alkyl-meta-cresol formed during the digestion; all as more fully hereinafter set forth and as claimed.

Cresols are ordinarily obtained commercially from coal tar. They are produced in the form of a crude mixture containing the three isomeric forms of cresol. The ortho-cresol contained in the mixture is readily separated out by fractional distillation, as its boiling point is substantially lower than those of the meta-cresol and para-cresol. On the other hand, the boiling points of the meta-cresol and the para-cresol are so close that these compounds cannot be separated commercially by fractional distillation. Other methods of separation increase the cost of the separated cresols so much that it is customary to market the mixture of meta-cresol and para-cresol as such and these mixtures constitute the cheapest source of either or both of these compounds. These commercially available mixtures generally contain about 60 per cent meta-cresol and about 40 per cent para-cresol.

In order to make the use of these commercial cresol mixtures economically desirable in the production of alkyl substitution products of either of its components, it is essential that the other component or a commercially valuable alkyl substitution product of the other component be readily recoverable as a by-product of the process.

We have now discovered a method for the production of a mono-alkyl-meta-cresol from mixtures of meta-cresol and para-cresol in which the para-cresol component of the mixture is recovered in the form of a di-alkyl substituted para-cresol which is extremely valuable commercially, particularly for use as an antioxidant in gasoline and other petroleum products.

In the method of our invention a mixture of m-cresol and p-cresol is first alkylated by contacting with an olefin in the presence of a small amount of an acid condensing agent or merely under heat and pressure. An iso-olefin is usually used in amount sufficient to supply at least two mols of olefin per mol of cresol. This alkylation step produces a mixture of a di-alkyl-meta-cresol and a di-alkyl-para-cresol. This mixture is then separated into its components by fractional distillation. The di-alkyl-meta-cresol and the di-alkyl-para-cresol will generally have sufficiently widely spaced boiling points to permit their ready separation by this means. If an acid condensing agent has been used it is necessary before fractional distillation to neutralize the mixture by washing with dilute aqueous alkali solution in order to prevent dealkylation of the products.

The di-alkyl-para-cresol thus obtained, as a by-product of the process in general, is a highly valuable commercial product, particularly for use as an antioxidant to prevent undesirable oxidational changes in cracked gasolines and various other petroleum products. The fraction containing the di-alkyl-para-cresol recovered from the fractional distillation may be used directly as an anti-oxidant or it may be redistilled and recrystallized to obtain a substantially pure product.

The di-alkyl-meta-cresol obtained in the first step of our process is further treated for the production of mono-alkyl-meta-cresol. We have discovered that if di-alkyl-meta-cresol is digested with a cresol having no added alkyl substituents in the presence of an acid catalyst, usually at a slightly elevated temperature, homogenization of the mixture takes place, the di-alkyl-meta-cresol being dealkylated to the extent of one alkyl group, and the un-alkylated cresol being alkylated to the extent of one alkyl group by the alkyl group released from the di-alkyl-meta-cresol. Accordingly in the method of our invention, di-alkyl-meta-cresol obtained in the first step of the process is mixed, usually in equi-molecular proportions, with an unalkylated cresol, such as meta-cresol; a small amount of an acid catalyst such as sulfuric acid or ferric chloride is added to the mixture and the mixture is digested at a slightly elevated temperature of about 70° to 80° C. The degree of homogenization produced, and thus the yield of mono-alkyl-meta-cresol, will vary with the time of digestion. After digestion the mixture is neutralized and washed with dilute aqueous alkali solution and is fractionally distilled to recover the mono-alkyl-meta-cresol.

While the method of our invention is applicable to the production of mono-alkyl substitution products of meta-cresol in which various alkyl groups, such as propyl, butyl or amyl groups are substituted, the process will be described in further detail herein in connection with the production of tertiary butyl substitution products of meta-cresol and para-cresol as an example of one application of our process in which the by-product para-cresol compound is of high commercial value.

In carrying out the method of our invention for the production of mono-tertiary-butyl-meta-cresol, a mixture of meta-cresol and para-cresol such as is ordinarily commercially available is first butylated to produce a mixture of di-tertiary-butyl-meta-cresol and di-tertiary-butyl-para-cresol. The butylation may be carried out in various ways. However, we have found it advantageous in most instances to effect the butylation by passing iso-butylene or gases containing it into the cresol mixture to which has been added an acid condensing agent such as sulfuric acid, aluminum chloride, boron trichloride or the like. We prefer to use sulfuric acid as the condensing agent in amounts corresponding to about 5 per cent by weight of the cresol mixture. The iso-butylene gas is added, preferably until the cresol mixture has absorbed at least about two mols of iso-butylene per mol of cresol to insure as complete conversion of the cresols to di-alkyl substituted compounds as is possible.

The butylated reaction mixture is then washed with dilute aqueous alkali solution, for example a 5 per cent to 10 per cent solution of caustic soda or a 10 per cent to 15 per cent solution of sodium carbonate or a sodium bicarbonate solution to neutralize and remove the acid condensing agent and any unreacted cresols. The alkali-washed butylated cresols are then fractionally distilled to isolate the di-butyl-meta-cresol and the di-butyl-para-cresol. The distillation is preferably carried out under reduced pressure, the fractions containing the respective components being separately recovered.

The fraction containing the di-tertiary-butyl-para-cresol or 2,6-di-tertiary-butyl-4-methyl-phenol is a valuable commercial product, particularly for use as an anti-oxidant in cracked gasolines and other petroleum products. The fraction may be used as an anti-oxidant without further treatment if desired, or it may be treated for the isolation of a substantially pure 2,6-di-tertiary-butyl-4-methyl-phenol by refractionation and recrystallization.

The fraction containing the di-tertiary-butyl-meta-cresol has little known commercial value and is treated further according to the method of our invention for the production of mono-tertiary-butyl-meta-cresol by homogenization. In the homogenization step the di-tertiary-butyl-meta-cresol is digested in the presence of an acid catalyst such as sulfuric acid or ferric chloride, at a slightly elevated temperature, with a cresol such as meta-cresol or para-cresol or a mixture of meta-cresol and para-cresol. Sulfuric acid is generally used in an amount corresponding to about 2.5 per cent of the digestion mixture as the catalyst. The digestion is usually carried out at a temperature on the order of about 70° to 80° C. The time of digestion may vary over a relatively wide range. Digestions carried out at temperatures of about 70° to 80° C. for a period of about 4 hours have produced satisfactory yields.

While this homogenization step may be carried out using any unbutylated cresol, when a cresol other than meta-cresol is used either alone or in admixture with meta-cresol, the resulting digestion mixture will contain other mono-tertiary-butyl-cresol products than mono-tertiary-butyl-meta-cresol. It is advantageous therefore to use meta-cresol alone. If the meta-cresol and di-tertiary-butyl-meta-cresol are digested together in substantially equimolecular proportions, mono-tertiary-butyl-meta-cresol is formed with substantially no loss of iso-butylene from the digestion mixture.

If desired, the meta-cresol for use in the homogenization step may be obtained by completely debutylating a portion of the di-tertiary-butyl-meta-cresol. Commercially available meta-cresol is relatively expensive and it is generally economically undesirable to use such a material in the homogenizing step because of the resulting increase in the cost of the mono-tertiary-butyl-meta-cresol produced. It is convenient therefore to decompose a part of the di-tertiary-butyl-meta-cresol with an acid to produce meta-cresol and iso-butylene. The meta-cresol thus produced may then be digested with the remainder of the di-tertiary-butyl-meta-cresol to produce mono-tertiary-butyl-meta-cresol. The iso-butylene may be returned to the first step of the process for the butylation of further quantities of the mixture of meta-cresol and para-cresol.

In carrying out the method of our invention in this manner about half of the di-tertiary-butyl-meta-cresol produced in the first step of the process is generally refluxed at atmospheric pressure with a small amount of sulfuric acid, on the order of at least 0.05 cc. of 95 per cent $H_2SO_4$ per 100 grams of material until the evolution of isobutylene has ceased. The isobutylene is condensed for re-use in the butylation of further amounts of meta-cresol and para-cresol mixtures. The meta-cresol is mixed with the remaining portion of di-tertiary-butyl-meta-cresol and the mixture subjected to homogenization as above described.

The reaction mixture from the homogenization step is neutralized usually by washing with a dilute aqueous alkali solution such as a caustic soda, sodium carbonate or sodium bicarbonate solution and with water. The resulting washed alkali-insoluble product is then fractionally distilled, the fraction boiling between 128.5° and 131.5° C. at 20 mm. pressure being collected. A substantially pure mono-tertiary-butyl-meta-cresol is thus obtained.

The following example illustrates the results which may be obtained in practicing the process of our invention in the production of mono-tertiary-butyl-meta-cresol:

To 420 grams of a commercial mixture of meta-cresol and para-cresol, about 5 per cent by weight of concentrated sulfuric acid was added. The mixture was vigorously agitated while 416.5 grams of isobutylene were introduced into it. The resulting reaction mixture was washed several times with a dilute caustic soda solution and with water. A reduction in volume of the reaction mixture of about 3.7 per cent occurred during washing. About 695 cc. of the washed reaction mixture were charged in a still equipped with a column having an efficiency of 5.5 theoretical plates and the mixture was fractionally distilled over a small amount of sodium carbonate at about 20 mm. pressure. Di-tertiary-butyl-para-cresol was collected as a fraction boiling from 145° to 148° C. Di-tertiary-butyl-meta-cresol was collected between 163.5° and 168° C.

A yield of about 317 cc. of di-tertiary-butyl-meta-cresol was obtained which solidified on cooling and on one recrystallization from hexane gave a product of 100 per cent purity. The di-tertiary-butyl-para-cresol was retained for future use and the di-tertiary-butyl-meta-cresol was further treated for the production of mono-tertiary-butyl meta-cresol.

A 99 gram portion of the di-tertiary-butyl-meta-cresol product was mixed with m-cresol (48.5 grams) in equimolecular proportion and 2.5 per cent by weight of concentrated sulfuric acid was added as a catalyst. The mixture was digested for 4 hours between 70° and 80° C. The reaction mixture was then washed three times with saturated sodium bicarbonate solution and then twice with water. About 146 cc. of the washed reaction product were charged in a still equipped with a five theoretical plate column. The distillation was started at atmospheric pressure to remove water. The pressure was then reduced to 20 mm. and the mixture fractionally distilled. The fraction containing liquid mono-tertiary-butyl-meta-cresol was collected between 128.5° and 131.5° C. A yield corresponding to about 74 per cent of the di-tertiary-butyl-meta-cresol and the meta-cresol originally introduced was obtained.

While the method of our invention has been described herein in connection with certain preferred embodiments, it will be understood that we do not intend that our invention shall be limited to these specific forms except as defined hereinafter in the appended claims.

What we claim is:

1. The process of producing a mono-alkyl substituted meta-cresol from a mixture of meta-cresol and para-cresol comprising dialkylating said mixture with a tertiary olefin, washing and neutralizing the reaction mixture with a dilute aqueous alkali solution, fractionally distilling the alkali-insoluble portion of the reaction mixture and separately recovering the di-alkyl-para-cresol and di-alkyl-meta-cresol, mixing the di-alkyl-meta-cresol with a cresol having no added alkyl substituents, acidifying the mixture and digesting at a slightly elevated temperature sufficient to effect homogenization of the di-alkyl meta-cresol and the cresol having no added alkyl substituents, washing and neutralizing the mixture after digestion with dilute aqueous alkali, fractionally distilling the alkali-insoluble portion and recovering the mono-alkyl-meta-cresol.

2. In a process of producing a mono-alkyl-meta-cresol, the steps comprising producing a a mixture of di-alkyl-meta-cresol and di-alkyl-para-cresol by treating a mixture of meta-cresol and para-cresol with an olefin, separating the di-alkylated products by fractional distillation digesting at a slightly elevated temperature the di-alkyl-meta-cresol thus obtained, in the presence of an acid catalyst, with a cresol having no added alkyl substituents until substantial homogenization of the di-alkyl meta-cresol with the cresol having no added alkyl substituents is effected, neutralizing the reaction mixture, and recovering the mono-alkyl-metal-cresol from the neutralized digestion mixture by fractional distillation.

3. In a process of producing mono-alkyl-meta-cresol, the steps comprising producing a mixture of di-alkyl-meta-cresol and di-alkyl-para-cresol by treating a mixture of meta-cresol and para-cresol with a tertiary olefin in the presence of an acid condensing agent, separating the di-alkylated products by fractional distillation, digesting at a slightly elevated temperature the di-alkyl-meta-cresol thus obtained with meta-cresol in the presence of an acid catalyst until substantial homogenization of the di-alkyl meta-cresol with the meta-cresol is effected, neutralizing the reaction mixture and recovering the mono-alkyl-meta-cresol from the neutralized digestion mixture by fractional distillation.

4. In a process of producing a mono-alkyl-meta-cresol, the steps comprising producing a mixture of di-alkyl-para-cresol and di-alkyl-meta-cresol by treating a mixture of meta-cresol and para-cresol with an olefin, separating the di-alkylated products by fractional distillation, de-alkylating a portion of the di-alkyl-meta-cresol by warming in the presence of an acid, mixing the meta-cresol thus obtained with the remainder of the di-alkyl-meta-cresol, digesting the mixture at a slightly elevated temperature in the presence of an acid catalyst until homogenization of the meta-cresol and the di-alkyl meta-cresol is effected, neutralizing the digestion mixture and recovering mono-alkyl-meta-cresol from the digestion mixture by fractional distillation.

5. In a process of producing a mono-tertiary-butyl-meta-cresol, the steps comprising producing a mixture of di-tertiary-butyl-para-cresol and di-tertiary-butyl-meta-cresol by treating a mixture of meta-cresol and para-cresol with iso-butylene, separating the di-tertiary-butyl products by fractional distillation, digesting at a slightly elevated temperature the di-tertiary-butyl-meta-cresol thus obtained, in the presence of an acid catalyst, with a cresol having no added alkyl substituents until substantial homogenization of the di-tertiary butyl meta-cresol with the cresol having no added alkyl substituents is effected, neutralizing the mixture, after digestion, and recovering the mono-tertiary-butyl-meta-cresol from the neutralized digestion mixture by fractional distillation.

6. In a process of producing a mono-tertiary-butyl-meta-cresol, the steps comprising producing a mixture of di-tertiary-butyl-meta-cresol and di-tertiary-butyl-para-cresol by treating a mixture of meta-cresol and para-cresol with iso-butylene in the presence of an acid condensing agent, neutralizing the mixture, separating the di-tertiary-butyl products by fractional distillation, digesting at a temperature of about 70° to 80° C. the di-tertiary-butyl-meta-cresol thus obtained with meta-cresol in substantially equimolecular proportions in the presence of an acid catalyst until substantial homogenization of the di-tertiary butyl meta-cresol with the meta-cresol is effected, neutralizing the mixture after digestion and recovering the mono-tertiary-butyl-meta-cresol from the neutralized digestion mixture by fractional distillation.

7. In a process of producing mono-alkyl meta-cresol, the steps comprising producing a mixture of di-alkyl meta-cresol and di-alkyl para-cresol by treating a mixture of meta-cresol and para-cresol with a tertiary olefin in the presence of an acid condensing agent, separating the di-alkylated products by fractional distillation, digesting at a temperature of 70° to 80° C. the di-alkyl meta-cresol thus obtained with meta-cresol in the presence of an acid catalyst until substantial homogenization of the di-alkyl meta-cresol with the meta-cresol is effected, neutralizing the reaction mixture and recovering the mono-alkyl meta-cresol from the neutralized digestion mixture by fractional distillation.

8. In a process of producing mono-tertiary butyl meta-cresol, the steps comprising producing a mixture of di-tertiary butyl para-cresol and di-tertiary butyl meta-cresol by treating a mixture of meta-cresol and para-cresol with isobutylene, separating the di-tertiary butyl products by fractional distillation, digesting at a temperature of 70° to 80° C. the di-tertiary butyl meta-cresol thus obtained in the presence of an acid catalyst with a cresol having no added alkyl substituents until substantial homogenization of the di-tertiary butyl meta-cresol with the cresol having no added alkyl substituents is effected, neutralizing the mixture after digesting and recovering the mono-tertiary butyl meta-cresol from the neutralized digestion by fractional distillation.

DONALD R. STEVENS.
JOSEPH B. McKINLEY.